June 29, 1937.  L. DILLON  2,085,010
AIRCRAFT DRIFT INDICATOR
Filed June 6, 1933  2 Sheets-Sheet 2
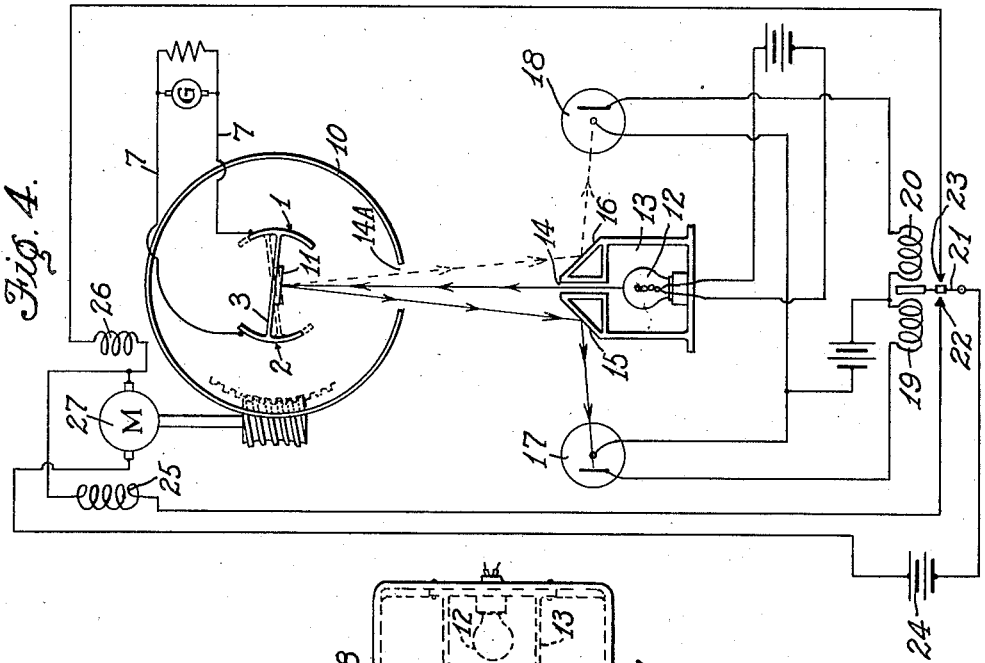
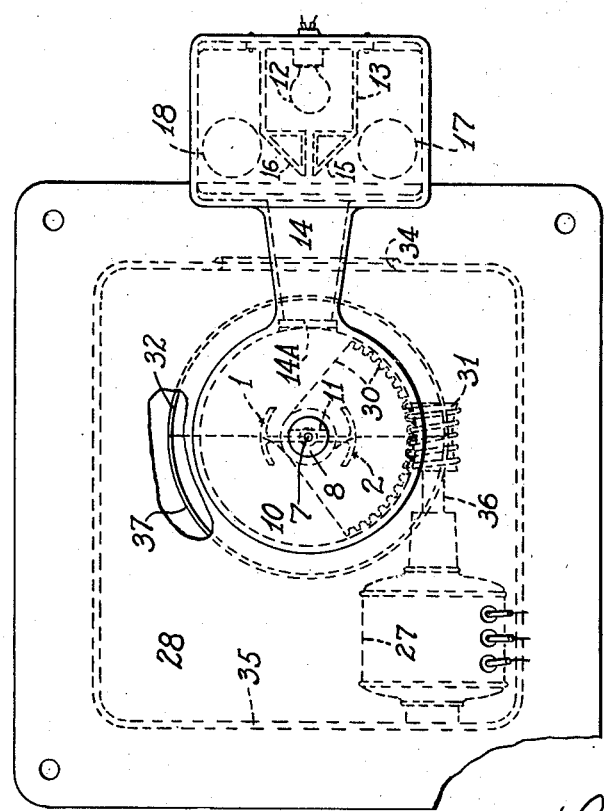
INVENTOR.
Lyle Dillon Patented June 29, 1937

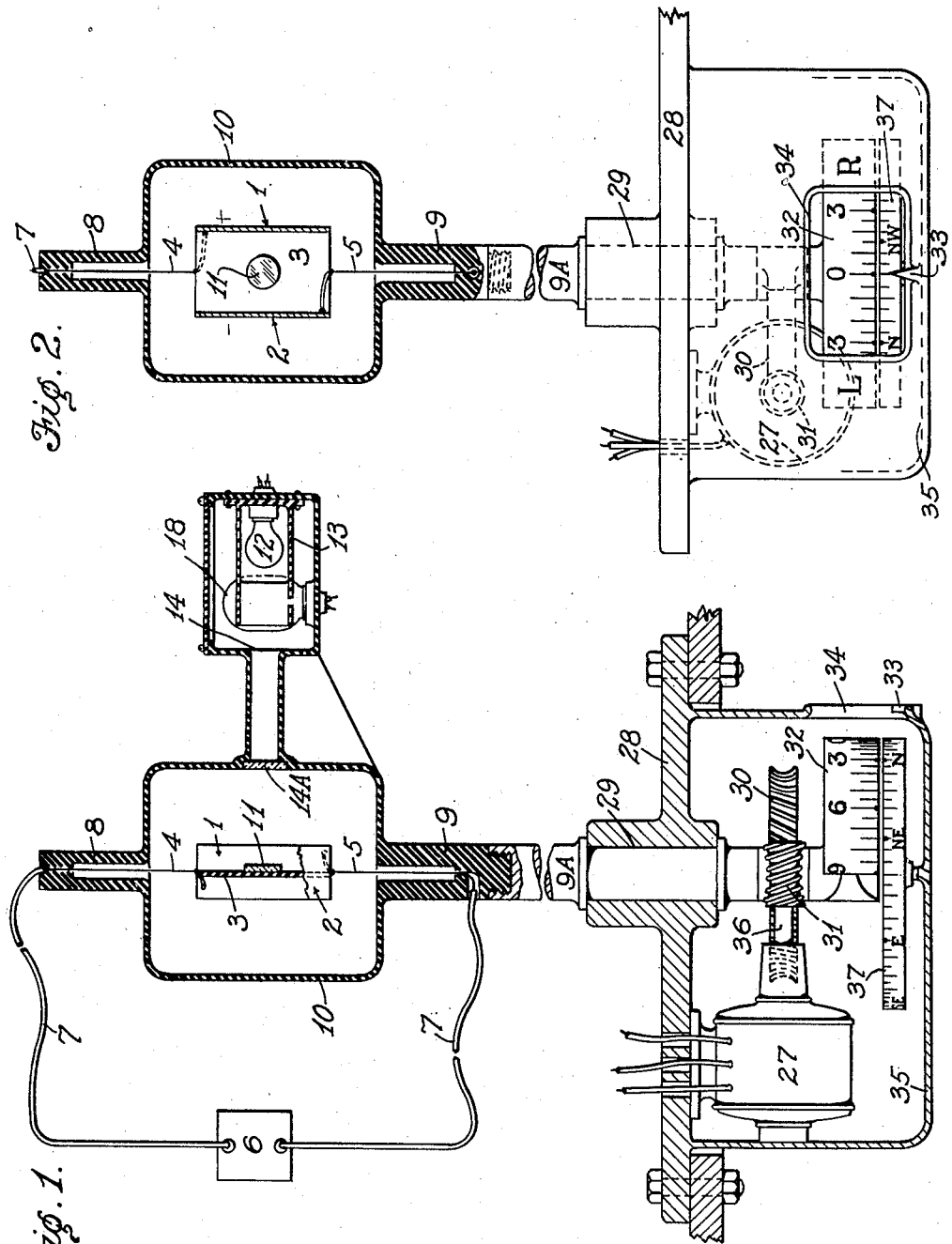

2,085,010

UNITED STATES PATENT OFFICE 2,085,010

AIRCRAFT DRIFT INDICATOR

Lyle Dillon, Los Angeles, Calif.

Application June 6, 1933, Serial No. 674,516

4 Claims. (Cl. 33—204)

This invention relates to a method of, and apparatus for, measuring or indicating the actual direction of motion of a body relative to the surface of the earth.

The object of this invention is to provide a means for ascertaining the direction of motion with respect to the earth's surface of any conveyance or vehicle subjected to deviations from its apparent course or heading, where direct observation of such deviations is impossible. The object of this invention is more particularly to provide a means for ascertaining the direction of motion, with respect to the earth's surface, of aircraft and/or watercraft which, being supported in a mobile medium out of contact with the earth's surface, are apt to have motions relative to the earth's surface which are different in direction from the said craft's apparent motion or heading. A more specific object of this invention is to provide a means for indicating the drift of aircraft, navigating under conditions known as "blind flying."

The drift angle is known as the angle between the apparent direction of motion or heading of the craft (as indicated by a compass) and the actual motion of the craft over the ground.

In practice, the direction of flight of aircraft, with respect to the earth or ground, is determined by correcting the compass course or apparent heading, in accordance with the drift angle, said drift angle being obtainable heretofore only by direct observation from the craft, upon the earth or any stationary visible object.

It is the purpose of this invention to provide aircraft with a device for ascertaining their drift angle when the earth's surface is obscure and no stationary objects are visible therefrom upon which to make drift observations.

The principle upon which this device is based is that an electric charge in motion through a magnetic field is acted upon by a force, the magnitude of which is dependent upon the quantity of the charge and the velocity of its motion; the direction of the force is at right angles to both the line of motion and the direction of the magnetic field.

The device which is the subject of this invention comprises an indicator actuated by an electrically charged element which, according to the principle outlined above, is sensitive to and reacted upon by the vertical component of the earth's magnetic field, when in motion therethrough. The reactive force upon the charged element in motion by the said earth field is such that the element is caused to indicate the direction of the motion through the field. Since the earth field is stationary with respect to the earth's surface, the directional indication of the said charged element will be an indication of the true direction of motion of the device relative to the earth's surface.

The method which is the subject of this invention comprises moving an electrically charged body through the terrestrial magnetic field and observing the direction or magnitude of the reactive force upon said charged body when in motion through the said field and deducing therefrom the direction of motion of said body with respect to said field.

The drawings are referred to for a diagrammatic illustration of a typical embodiment of this invention.

Fig. 1 is a sectional side elevation of the apparatus.

Fig. 2 is a front elevation and section taken from section line A—A.

Fig. 3 is a partial plan view.

Fig. 4 is a diagram of the orienting apparatus with its electrical connections.

Like reference numerals designate like parts throughout the several views.

Referring to Figs. 1 and 2, the numerals 1 and 2 represent the electrically charged element comprising metallic plates separated and rigidly maintained in electrostatic relation one to another, by insulating member 3 made of material such as hard rubber. These plates are capable of receiving and maintaining opposite electrical charges, one with respect to another.

The element comprising parts 1, 2, and 3 is rotatably suspended by tungsten filaments 4 and 5. Plates 1 and 2 are charged from a source of E. M. F., such as the high voltage direct current generator schematically shown at 6, in the electrical circuit completed by electrical connections 7 and tungsten filaments 4 and 5.

The generator 6 may be any suitable source of unidirectional high voltage such as a high voltage direct current generator especially wound to deliver an E. M. F. of approximately 5,000 to 10,000 volts, and driven by a suitable fractional horsepower motor or driven by a suitable propeller placed in the air stream; or generator 6 may comprise a high tension transformer or induction coil with a vacuum tube or chemical rectifier to produce a high unidirectional voltage. Devices capable of performing the function of the generator 6 are well known in the electrical art.

The filaments 4 and 5 are attached at the top and bottom of hollow shafts 8 and 9, respectively, and rotatably support the plates in the center of the cylindrical container 10. In the center of the insulating member 3 is positioned a small mirror 11.

Referring to the orienting mechanism in Fig. 3, a small electric light 12 is shown in enclosure 13, supported by brackets on, and rigidly connected to the cylinder 10. A thin slit 14 and transparent window 14A, is shown, through which light from 13 passes and impinges upon and reflected from mirror 11 to either of the oblique mirrors 15 or 16, depending upon the angular position of the said mirror. A light beam from 11 thus striking mirrors 15 or 16 is reflected into light sensitive cells 17 or 18, respectively. These light sensitive cells energize relay magnets 19 or 20, which in turn actuate contact lever 21, causing it to make contact with points 22 or 23, as the light beam is deflected into the said cells 17 or 18, respectively. The closing of contact 22 or 23 completes the electrical circuit, of which 24 is the current source, through reversed fields 25 and 26 of reversible orienting motor 27. Fig. 1 shows cylinder 10 supported vertically a distance above base plate 28 by shafts 9 and 9A. Cylinder 10, the before-mentioned brackets, and said shaft 9 are composed of an insulating material, and are joined to shaft 9A at a point close to the base plate. Said shaft is mounted in bearing 29 so that it and the cylinder 10 and orienting apparatus connected thereto, which it supports, may be rotated about the vertical axis. The lower extension of shaft 9A has fixed to it a worm gear 30, which meshes with worm pinion 31, which in turn is carried at the end of orienting motor shaft 36 of the reversible orienting motor 27. Below worm gear 30 also attached to the shaft extension and fixed with respect to gear 30 and cylinder 10 is a circular segment 32 graduated in degrees of arc. Pointer 33 serves to indicate on the said segment 32 through transparent window 34 the angular position of the cylinder 10 with respect to the fixed base 28. The said base 28 serves as a support and is rigidly and immovably attached to the aircraft or other vessel. A case 35 attached to bottom of base 28 encloses the above described mechanism.

As a concrete example of operation of these devices, let it be assumed that the initial position of the element 1, 2, and 3 is such that the member 3 and mirror 11 of the suspended element is perpendicular to a line through the center of the mirror and the illuminated slit 14, in which position the light from lamp 13 will be reflected and returned through slit 14, and will not fall upon either mirror 15 or 16. Let it be further assumed that under the above assumed condition the cylinder 10 is in such a position with respect to the aircraft that the line from mirror 11 to lamp 13 is parallel to the longitudinal axis of the aircraft, and that in this condition the base 28 is so fixed to the aircraft that pointer 33 will coincide with the zero degree graduation upon the graduated sector 32. Now if the aircraft is put into motion through air which is itself in motion with respect to the earth, and the said motion of the aircraft is at an angle with the said direction of motion of the air, the resultant motion of the aircraft with respect to the earth will be at an angle to its longitudinal axis or heading. This angle of true motion, with respect to heading is, as defined above, known as the drift angle. Assume the drift angle or angle of true motion to be 15° to the right of the heading. In this condition the forces which act upon the oppositely charged plates 2 and 3 will be such that one of them is forced in a direction to the left of, and the other one in a direction to the right of, the line of motion thereof, depending upon the relative signs of the charges, resulting in a torsional couple tending for example to rotate the element 1, 2 and 3 to the right, or in a clockwise direction, as viewed from the top in Fig. 3 or 4. This said torsional couple will cause a small initial rotational displacement of mirror 11, allowing the reflected light beam from slit 14 to impinge upon mirror 15 and be reflected therefrom into light sensitive cell 17. Cell 17 thus sensitized, energizes magnet 19, which in turn closes contact between lever 21 and point 22, which completes the circuit from battery 24 through one of the field windings 25 of the reversible motor 27. The direction of the rotation of the reversible motor thus controlled is such that the worm pinion 31 acting upon worm gear 30 causes the cylinder 10 to rotate in the same angular direction as the beam displacement, thus following up the rotational tendency of the elements therein. The rotational displacement of the element 1, 2, and 3 will for this reason always be small, resulting in minimum torsional stresses in the suspension filaments, a condition for maximum sensitivity. The action described will continue until the element 1, 2, and 3 and cylinder 10 have turned to the right 15°, at which time the element 1, 2, and 3 will no longer be acted upon by torsional forces, the beam of light will return to its central position and the cylinder 10 will come to rest. In this position the pointer 33 will give a directional indication upon the graduated segment 32, of 15° to the right of the zero graduation. To determine the actual direction of motion of the aircraft it will be necessary to add to this indicated 15° drift angle to the compass reading of apparent heading. A compass, as shown at 37, can be mounted in the lower portion of the case 35 directly below graduated disc 32, making possible the direct reading thereon of the true course of the craft.

The intensity of the vertical component of the earth's field varies from place to place, increasing from zero at the equator to a maximum at the poles. This instrument accordingly will have a sensitivity which is a maximum in the extreme northern and southern latitudes and decreasing toward the equator.

Cylinder 10 may be filled with a special insulating oil or other suitable fluid to dampen the vibrating and swinging tendency of the elements.

The disclosures herein are not to be taken as limiting but merely illustrative of one embodiment of the invention, for many modifications thereof are possible within the scope of the following claims.

I claim:

1. An apparatus for determining the drift angle of an aircraft which comprises an element rotatable about a vertical axis composed of two insulated metallic bodies in horizontal electrostatic relation one to another, means to maintain an electrical potential difference between said metallic bodies, a rotatable support for said element, means responsive to the rotational displacement of said element for causing said support to follow said rotational displacement, and angle indicating means attached to said support to indicate the total angular movement of said support.

2. Apparatus for determining the drift angle of an aircraft which comprises an element rotatable about a vertical axis and adapted to receive an electric charge, means for electrically charging said element, a support for said element, mechanical direction indicating means associated with said support, means controlled by the deflection of said element for rotating said support and said indicating means in response to the said electrodynamic force, whereby a normal predetermined relation is maintained between said element and said direction indicating means.

3. An apparatus for determining the drift angle of an aircraft which comprises an electrostatically charged body adapted to be moved with the aircraft through the earth's magnetic field and so supported as to be capable of deflection in response to electrodynamic forces attending upon such motion and indicating means associated with said body and controlled by the deflection of said body as the result of said electrodynamic forces to indicate the direction of such motion with respect to the heading of said aircraft.

4. An apparatus for determining the drift angle of an aircraft which comprises an electrostatic charged body adapted to be moved with the aircraft through the earth's magnetic field and so supported as to be capable of deflection in response to electrodynamic forces attending upon such motion and indicating means associated with said body to indicate the direction of such deflection with respect to the heading of said aircraft.

LYLE DILLON.